US009360328B2

(12) United States Patent
You et al.

(10) Patent No.: US 9,360,328 B2
(45) Date of Patent: Jun. 7, 2016

(54) APPARATUS AND METHOD FOR RECOGNIZING DRIVING ENVIRONMENT FOR AUTONOMOUS VEHICLE

(71) Applicant: Hyundai Motor Company, Seoul (KR)

(72) Inventors: Byung Yong You, Gyeonggi-do (KR); Myung Seon Heo, Seoul (KR); Young Chul Oh, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/555,757

(22) Filed: Nov. 28, 2014

(65) Prior Publication Data

US 2016/0061612 A1   Mar. 3, 2016

(30) Foreign Application Priority Data

Sep. 2, 2014 (KR) .......................... 10-2014-0116412

(51) Int. Cl.
*G01C 21/26* (2006.01)
*G01S 19/13* (2010.01)

(52) U.S. Cl.
CPC .................. *G01C 21/26* (2013.01); *G01S 19/13* (2013.01)

(58) Field of Classification Search
CPC ............... G05D 1/024; G05D 1/0278; G05D 2201/0213; G05D 1/027; G05D 1/0274; G05D 1/0214; G05D 1/0246; G05D 1/0272; B60W 30/00; G01S 17/936
USPC .............. 701/1, 23, 24, 25, 26, 28, 31.4, 117, 701/300, 409, 435, 469, 472, 533; 714/746; 382/103, 104; 342/54; 346/629; 52/236.3
See application file for complete search history.

(56) References Cited

U.S. PATENT DOCUMENTS 6,442,476 B1 *  8/2002  Poropat .................... G01S 5/16
                                                              701/23
8,849,494 B1 *  9/2014  Herbach ............... B60W 30/00
                                                              701/24

(Continued)

FOREIGN PATENT DOCUMENTS

JP      H11-296799 A    10/1999
JP      4425669 B2       3/2010

(Continued)

OTHER PUBLICATIONS

Minchae Lee et al., "Information Fusion of Cameras and Laser Radars for Perception Systems of Autonomous Vehicles", Journal of Korean Institute of Intelligent Systems, 23(1), pp. 35-45 (Feb. 2013).

*Primary Examiner* — James Trammell
*Assistant Examiner* — Sanjeev Malhotra
(74) *Attorney, Agent, or Firm* — Mintz Levin Cohn Ferris Glovsky and Popeo, P.C.; Peter F. Corless

(57) ABSTRACT

An apparatus and a method are provided for recognizing driving environment for an autonomous vehicle. The apparatus includes a controller configured to receive navigation information from a satellite navigation receiver. The controller is further configured to receive map data from a map storage and image data from an image sensor regarding captured images from around a vehicle and distance information from a distance sensor regarding sensed objects positioned around the vehicle. The controller is also configured to determine a fusion method for information measured by the image sensor and the distance sensor based on a receiving state of the satellite navigation receiver and precision of the map data to recognize the driving environment.

19 Claims, 3 Drawing Sheets

(56) References Cited

U.S. PATENT DOCUMENTS

| | | | |
|---|---|---|---|
| 8,880,270 B1* | 11/2014 | Ferguson | B60W 30/00 701/23 |
| 2004/0062419 A1* | 4/2004 | Roh | G06K 9/00664 382/104 |
| 2004/0133341 A1* | 7/2004 | Spriggs | G08G 5/0013 701/435 |
| 2005/0283699 A1* | 12/2005 | Nomura | G01C 21/32 714/746 |
| 2006/0106533 A1* | 5/2006 | Hirokawa | G01C 21/165 701/472 |
| 2007/0219720 A1* | 9/2007 | Trepagnier | B60W 30/00 701/300 |
| 2008/0039991 A1* | 2/2008 | May | G05D 1/024 701/25 |
| 2008/0059068 A1* | 3/2008 | Strelow | G05D 1/0246 701/469 |
| 2010/0106356 A1* | 4/2010 | Trepagnier | G01S 17/023 701/25 |
| 2010/0280699 A1* | 11/2010 | Bageshwar | G05D 1/0231 701/26 |
| 2011/0130918 A1* | 6/2011 | Kim | G01C 21/26 701/31.4 |
| 2011/0309967 A1* | 12/2011 | Choe | G05D 1/024 342/54 |
| 2012/0053755 A1 | 3/2012 | Takagi | |
| 2012/0101719 A1* | 4/2012 | Sung | G05D 1/0274 701/409 |
| 2013/0013204 A1* | 1/2013 | Kazama | G01C 21/3461 701/533 |
| 2013/0169678 A1* | 7/2013 | Ueno | H04M 1/0272 345/629 |
| 2013/0211656 A1 | 8/2013 | An et al. | |
| 2014/0088855 A1* | 3/2014 | Ferguson | G08G 1/166 701/117 |
| 2014/0172189 A1* | 6/2014 | Engel | G01C 21/34 701/1 |
| 2014/0330479 A1* | 11/2014 | Dolgov | B60W 30/16 701/28 |
| 2015/0033647 A1* | 2/2015 | Suhami | E04H 6/10 52/236.3 |
| 2015/0110344 A1* | 4/2015 | Okumura | G06K 9/00798 382/103 |

FOREIGN PATENT DOCUMENTS

| | | |
|---|---|---|
| JP | 2012-048642 A | 3/2012 |
| KR | 10-2012-0072131 | 7/2012 |
| KR | 10-2013-0091907 A | 8/2013 |
| KR | 10-2014-0078436 | 6/2014 |

\* cited by examiner

APPARATUS AND METHOD FOR RECOGNIZING DRIVING ENVIRONMENT FOR AUTONOMOUS VEHICLE

CROSS-REFERENCE TO RELATED APPLICATION(S)

Pursuant to 35 U.S.C. §119(a), this application claims the benefit of Korean Patent Application No. 10-2014-0116412, filed on Sep. 2, 2014, the disclosure of which is incorporated herein in its entirety by reference.

BACKGROUND

1. Field of the Invention

The present invention relates to an apparatus and a method for recognizing a driving environment for an autonomous vehicle capable of more accurately recognizing the driving environment using a fusion method different for an image sensor and a distance sensor based on precision of global positioning system (GPS) information and map information while coping with situations based on the recognized driving environment.

2. Discussion of the Related Art

An autonomous vehicle is a vehicle which is driven to a destination by allowing the vehicle itself to recognize driving environment without manipulation by a driver. The ability to accurately recognize a driving environment is particularly important when an autonomous vehicle is driven city centers, (e.g., urban environments). Accordingly, a study has been conducted regarding a technology of recognizing driving environment in which a global positioning system (GPS), map information, various types of sensors, etc., are fused.

Recently, a technology of recognizing driving environment mainly using a radar sensor, a light detection and ranging (LiDAR) sensor, and an image sensor has been introduced. The technology of recognizing driving environment according to the related art simply fuses the image sensor and the distance sensor without considering precision of the GPS information and the map information. Therefore, the technology of recognizing driving environment according to the related art is may generally not be applied in a downtown or city center.

Further, as in the related art, in the case of using a general map without using a detailed map, it is possible to perform relatively accurate position matching in a longitudinal direction but it may be difficult to perform accurate position matching in a latitudinal direction.

SUMMARY

The present invention provides an apparatus and a method for recognizing driving environment for an autonomous vehicle capable of more accurately recognizing a driving environment by using a fusion method different for an image sensor and a distance sensor based on precision of global positioning system (GPS) information and map information while coping with situations based on the recognized driving environment.

According to an exemplary embodiment of the present invention, an apparatus for recognizing driving environment for an autonomous vehicle may include: a satellite navigation receiver configured to receive a satellite signal from a satellite; a map storage configured to store map data; an image sensor configured to capture images around the vehicle; a distance sensor configured to sense objects positioned around the vehicle; and a controller configured to determine a fusion method for information measured by the image sensor and the distance sensor based on a receiving state of the satellite navigation receiver and precision of the map data to recognize the driving environment.

The controller may be configured to extract road bounding spheres using the image sensor and the distance sensor and derive a minimum bounding sphere of the extracted road bounding spheres, when the satellite signal is not received or the number of satellites which directly receives the satellite signal on a line of sight (LOS) is equal to or less than a reference value. The controller may be configured to map the minimum bounding sphere with the map data to generate a possible driving path. The controller may further be configured to extract road facilities using the image sensor and extract surrounding vehicle information using the distance sensor in response to receiving information included in the satellite signal is in an error range within several meters. The controller may be configured to perform probability based filtering on a comparison result of the road facilities with a landmark within the map data and the surrounding vehicle information to correct longitudinal and latitudinal positions of the vehicle.

Additionally, the controller may be configured to extract a substantially long range obstacle using the image sensor and extract a substantially short range obstacle using the distance sensor when receiving information within the satellite signal is less than a several meter (m) error and the map data is a detailed map. The controller may be configured to map the substantially long range obstacle and the substantially short range obstacle with the map data to recognize a driving situation and predict a behavior of a surrounding vehicle based on the driving situation. The controller may be configured to extract driving lane information using the image sensor and extract surrounding vehicle information using the distance sensor when receiving information within the satellite signal is less than a several m error (i.e., less than a predetermined distance error, greater than at least one m) and the map data is a detailed map. The controller may also be configured to perform probability based filtering on the driving lane information and the surrounding vehicle information to correct a latitudinal position of the vehicle.

According to another exemplary embodiment of the present invention, a method for recognizing driving environment for an autonomous vehicle may include: confirming reliability, by a controller, of a satellite signal received from a satellite and whether a detailed map is present; and recognizing, by the controller, driving environment by fusing information acquired by an image sensor and a distance sensor depending on the reliability of the satellite signal and whether the detailed map is present. The recognizing of the driving environment may include: confirming, by the controller, whether the reliability of the satellite signal is less than a reference value; extracting, by the controller, a road facility and surrounding vehicle information, respectively, using the image sensor and the distance sensor when the reliability of the satellite signal is less than the reference value; and correcting, by the controller, longitudinal and latitudinal positions of the vehicle by performing probability based filtering on the road facility and the surrounding vehicle information. The reference value used to determine reliability of the satellite signal may be expressed in dB down (−dB) or in a percentage of lost or corrupted data, or by other methods of calculation now known or later developed.

Further, the recognizing of the driving environment may further include: confirming, by the controller, whether the detailed map is present when the reliability of the satellite signal is greater than or equal to the reference value; extracting, by the controller, a substantially long range obstacle and a substantially short range obstacle using the image sensor and the distance sensor, respectively, when the detailed map is present; and predicting, by the controller, a behavior of the surrounding vehicle by mapping the substantially long range obstacle and the substantially short range obstacle with the detailed map. The recognition of the driving environment may further include: extracting, by the controller, driving lane information and the surrounding vehicle information using the image sensor and the distance sensor, respectively, when the detailed map is not present; and performing, by the controller, probability based filtering on the driving lane information and the surrounding vehicle information to correct a latitudinal position of the vehicle.

The method may further include: extracting, by the controller, a road bounding sphere using the image sensor and the distance sensor when the reception of the satellite signal is substantially unsatisfactory (e.g., the satellite signal is not completely transmitted/received or is transmitted/received with interruptions or errors); extracting, by the controller, a minimum bounding sphere of the road bounding spheres; and generating, by the controller, a possible driving path based on the minimum bounding sphere.

BRIEF DESCRIPTION OF THE DRAWINGS

The drawings are provided for reference in describing exemplary embodiments of the present invention, and the spirit of the present invention should not be construed only by the accompanying drawings. The above and other objects, features and other advantages of the present invention will be more clearly understood from the following detailed description when taken in conjunction with the accompanying drawings, in which.

DETAILED DESCRIPTION

Figure 1:
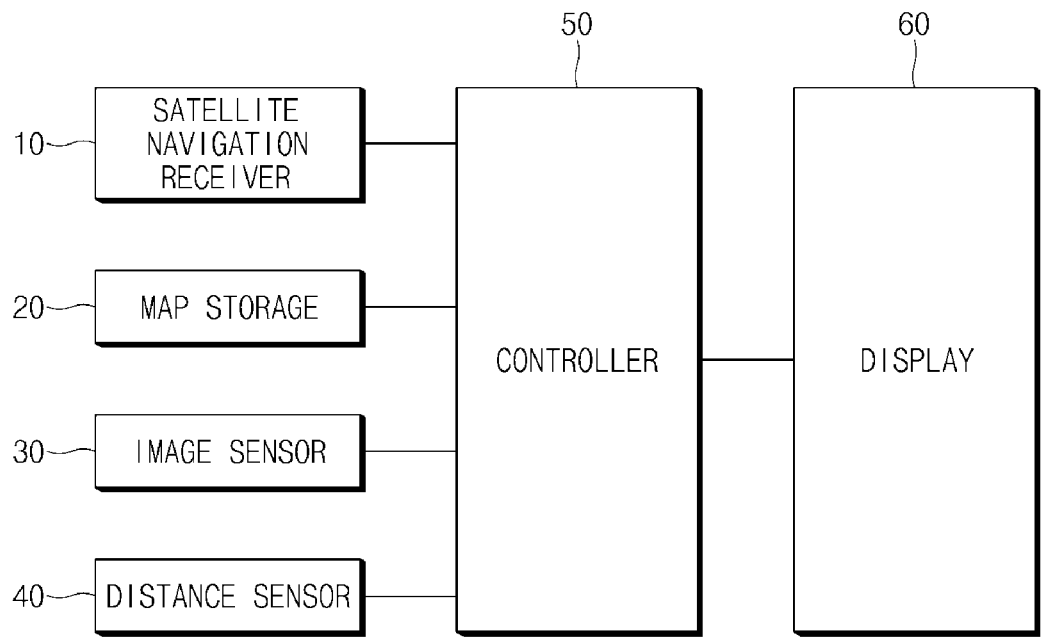
FIG. 1 is an exemplary block configuration diagram illustrating an apparatus for recognizing driving environment for an autonomous vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Figure 2:
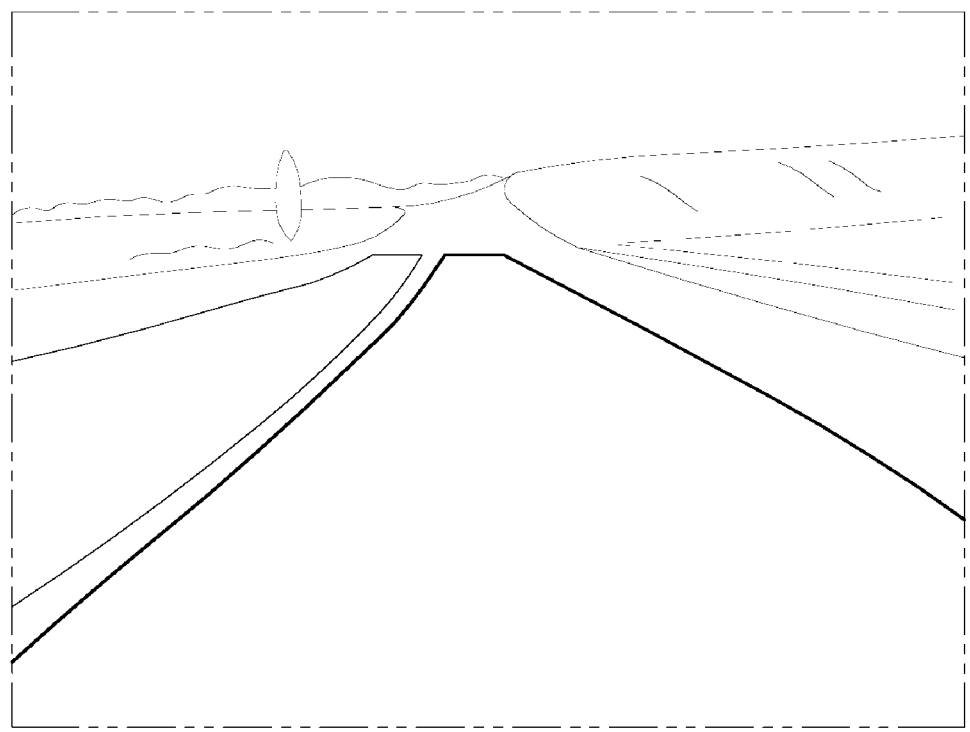
FIG. 2 is an exemplary diagram illustrating road bounding sphere extraction within an image according to an exemplary embodiment of the present invention.

Hereinafter, exemplary embodiments of the present invention will be described in detail with reference to the accompanying drawings FIG. 1 is an exemplary block configuration diagram illustrating an apparatus for recognizing driving environment for an autonomous vehicle according to an exemplary embodiment of the present invention and FIG. 2 is an exemplary diagram illustrating road bounding sphere extraction within an image according to an exemplary embodiment of the present invention.

As illustrated in FIG. 1, an apparatus for recognizing driving environment for an autonomous vehicle may include a satellite navigation receiver 10, a map storage 20, an image sensor 30, a distance sensor 40, a controller 50, and a display 60. The satellite navigation receiver 10 may include a global positioning system (GPS) receiver configured to receive a navigation message broadcast from a satellite. The satellite navigation receiver 10 may be configured to use navigation information (GPS information, GPS signal, and satellite signal) to confirm a current location of a vehicle, a total number of satellites which may receive satellite signals, the number of satellites whose signal may be received on a line of sight (LOS), a current vehicle speed, and the like. The controller may be configured to operate the satellite navigation receiver 10, the map storage 20, the image sensor 30, the distance sensor 40, and the display 60

The map storage 20 may be stored with map data including information regarding nature features such as point of interest (POI) information and landmark information. The map data may include a detailed map (a map of 1:25,000 scale, or greater) and/or a general map (a map of less than 1:25,000 scale). In general, a detailed map includes more information regarding natural features such as point of interest (POI)

information and landmark information than a general map. The image sensor 30 may be mounted within the vehicle to acquire images (front image, rear image, side images, or the like) around a vehicle. In particular, the image sensor 30 may include a single imaging device, (e.g., a camera, a video camera etc.), a stereoscopic imaging device, an omni-directional imaging device, a monocular imaging device, or the like.

The distance sensor 40 may be configured to detect objects around the vehicle and measure respective distances between the vehicle and the objects (e.g., measured objects, objects, obstacles, vehicle, and the like). In other words, the distance sensor 40 may be configured to detect information regarding the objects present around the vehicle. The distance sensor 40 may include radio detection and ranging (RADAR), light detection and ranging (LiDAR), an ultrasonic sensor, an infrared sensor, or the like. The controller 50 may be configured to determine a fusion method for the image sensor 30 and the distance sensor 40 based on a receiving state of the satellite navigation receiver 10 and whether the detailed map is present (see Table 1).

number of satellites which whose signal may be received on a line of sight (LOS) is equal to or less than a reference value. In other words, the controller 50 may be configured to extract the lane or a possible driving area using the image sensor 30 and the distance sensor 40 when a current position (e.g., a shadow area) of a traveling (e.g., the subject vehicle) may not be confirmed while driving.

As illustrated in FIG. 2, the controller 50 may be configured to extract a linear component from the image acquired by the image sensor 30 as the road bounding sphere and extract a linear component from data measured by the distance sensor 40 as the road bounding sphere. Further, the controller 50 may be configured to derive a minimum bounding sphere between the road bounding spheres extracted using the image sensor 30 and the distance sensor 40. In other words, the controller 50 may be configured to fuse information regarding the same target. The controller 50 may be configured to map the minimum bounding sphere with the map data to generate a possible driving path. Next, the controller 50 may be configured to operate a steering apparatus, a driving apparatus, a braking apparatus, and the like to operate the vehicle driving along the generated possible driving path.

TABLE 1

| Condition | Image sensor | Distance sensor | Fusion method | Final result |
| --- | --- | --- | --- | --- |
| GPS receiving quality (satisfaction) | Extract road bounding sphere | Extract road bounding sphere | min (sensor extraction area) | Generate possible driving path |
| GPS m unit error Presence of detailed map | Extract road facility | Extract surrounding vehicle information | Probability based filtering | Correct longitudinal and latitudinal positions |
| GPS m unit error Absence of detailed map | Extract road facility | Extract surrounding vehicle information | Probability based filtering | Correct longitudinal and latitudinal positions |
| GPS cm unit error Presence of detailed map | Extract substantially long range obstacle | Extract substantially short range obstacle | Map matching | Predict behavior of surrounding vehicle |
| GPS cm unit error Absence of detailed map | Extract lane type and curb | Extract surrounding vehicle information | Probability based filtering | Correct latitudinal position |

The controller 50 may be configured to extract some (e.g., recent satellite signals) of the GPS signals (e.g., satellite signals) received through the satellite navigation receiver 10 as a sample and calculate a standard deviation (e.g., a sample standard deviation) for the extracted GPS signal (e.g., signal strength). Further, the controller 50 may be configured to confirm whether the calculated sample standard deviation exceeds a threshold to determine reliability (e.g., precision) for the satellite navigation receiver 10. In other words, the controller 50 may be configured to determine that an error of information (e.g., position information) received through the satellite navigation receiver 10 is in a meter unit error range (from about 1 m to 10 m) when the sample standard deviation exceeds the threshold and determine that a receiving information error of the satellite navigation receiver 10 is in a centimeter unit error range (less than about 1 m) when the sample standard deviation is equal to or less than the threshold.

Hereinafter, a conditional sensor fusion strategy will be described with reference to Table 1. The controller 50 may be configured to extract each road bounding sphere (e.g., a possible driving area) using the image sensor 30 and the distance sensor 40 when the GPS signal (satellite signal) may not be received through the satellite navigation receiver 10 or the When the receiving information error of the satellite navigation receiver 10 is in a meter (m) unit error range and the detailed map is present, the controller 50 may be configured to extract road facilities using the image sensor 30 and may be configured to extract the surrounding vehicle information using the distance sensor 40 to determine a driving lane. The road facilities may include a crosswalk, a speed sign, a traffic lamp, a stop line, a speed surveillance camera, a speed bump, and the like.

In other words, when the subject vehicle is positioned in a current road area and a sample standard deviation for the GPS signal exceeds the threshold, the controller 50 may be configured to compare the road facility information acquired by the image sensor 30 with a landmark within the detailed map and use the compared result for the longitudinal position correction. Further, the controller 50 may be configured to use the surrounding vehicle information acquired by the distance sensor 40 to determine a driving lane, which may be used for the latitudinal position correction. In particular, the controller 50 may be configured to perform the probability based filtering on the information extracted by the image sensor 30 and the distance sensor 40 to correct the longitudinal and latitudinal position errors of the subject vehicle. A kalman filter, a particle filter, or the like, may be used as the probability based filter.

When the receiving information error of the satellite navigation receiver 10 is a meter unit error and the detailed map is not present, the controller 50 may be configured to extract road facilities using the image sensor 30 and extract the surrounding vehicle information using the distance sensor 40 to determine a driving lane. In other words, the controller 50 may be configured to confirm whether the subject vehicle is positioned on a current road and when the sample standard deviation of the satellite signal exceeds the threshold and the general map is present, perform the probability based filtering on the information extracted by the image sensor 30 and the distance sensor 40 to correct the longitudinal and latitudinal position errors of the subject vehicle. In particular, the landmark information may be more restrictively represented on the general map than on the detailed map.

Accordingly, when the receiving information error of the satellite navigation receiver 10 is the meter unit error, the controller 50 may be configured to extract the road facilities and the surrounding vehicle information using the image sensor 30 and the distance sensor 40 regardless of the precision of the map data and fuse the extracted information to correct the longitudinal and latitudinal position errors. In particular, as the fusion method, the probability based filter such as the kalman filter and the particle filter may be used. When the receiving information error of the satellite navigation receiver 10 is a centimeter unit error, the sample standard deviation for the GPS signal may be equal to or less than the threshold (e.g., a reference numerical value), and the detailed map is present, the controller 50 may be configured to detect substantially long range obstacles from the image acquired by the image sensor and detect substantially short range obstacles using the distance sensor 40.

Further, the controller 50 may be configured to map the detected obstacles with the map data to predict behaviors of surrounding vehicles depending on a front situation and surrounding obstacles (e.g., substantially long range obstacles and substantially short range obstacles). Further, when the receiving information error of the satellite navigation receiver 10 is in the centimeter unit error range, the sample standard deviation for the GPS signal may be equal to or less than the threshold (e.g., a reference numerical value), and the detailed map is not present, the controller 50 may be configured to extract the lane type, the curb, and the like from the image information (image) acquired by the image sensor 30 and acquire the surrounding vehicle information by the distance sensor 40.

Additionally, the controller 50 may be configured to perform the probability based filtering on the information acquired by the image sensor 30 and the distance sensor 40 to correct the latitudinal position error of the subject vehicle. The controller 50 may be configured to recognize the driving situation by using the fusion method of the image sensor 30 and the distance sensor 40 different in consideration of the receiving information received through the satellite navigation receiver 10 and the precision of the map data. Further, the controller 50 may be configured to operate the driving apparatus, the braking apparatus, the steering apparatus, a suspension apparatus, and the like depending on the recognized driving situation to operate the driving of the subject vehicle. In other words, according to an exemplary embodiment of the present disclosure, the autonomous vehicle may be configured to recognize the driving situation (surrounding situation) of the subject vehicle to cope with the situation.

The display 60 may be configured to display various information based on the operation of the controller 50. In other words, the display 60 may be configured to display the driving situations recognized by the sensor fusion and the driving control progressing situation for coping with the situations. The display 60 may include a pilot lamp, a light emitting diode (LED), an electro-luminescence element (EL), a vacuum fluorescence display (VFD), a cathode ray tube (CRT), a plasma display, a liquid crystal display (LCD), a head up display (HUD), or the like.

Figure 3:
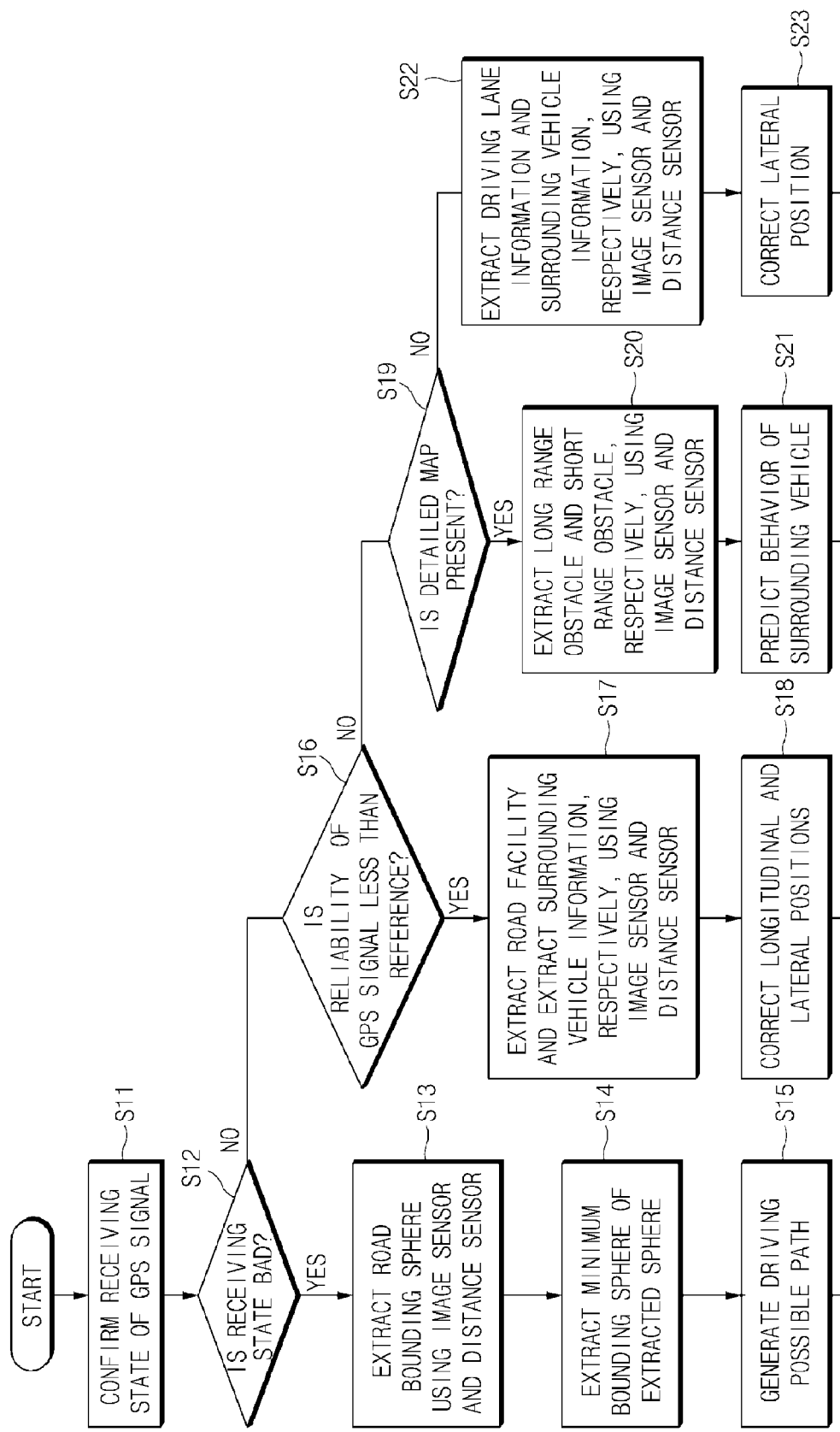
FIG. 3 is an exemplary flow chart illustrating a method for recognizing driving environment for an autonomous vehicle according to an exemplary embodiment of the present invention.

FIG. 3 is an exemplary flow chart illustrating a method for recognizing driving environment for an autonomous vehicle according to an exemplary embodiment of the present invention. First, the controller 50 may be configured to confirm the GPS signal receiving state of the satellite navigation receiver 10 (S11). In particular, the controller 50 may be configured to receive the image information and the distance information from the image sensor 30 and the distance sensor 40 mounted within the vehicle. The controller 50 may be configured to confirm whether the receiving state of the satellite navigation receiver 10 is substantially unsatisfactory (S12). In other words, the controller 50 may be configured to confirm whether the GPS signal (satellite) may not be received through the satellite navigation receiver 10 or whether the number of satellites which whose signal is directly received on the line of sight (LOS) is equal to or less than a reference value. An unsatisfactory state may be defined as a state when the GPS signal is not received through the satellite navigation receiver 10 or when a number of satellites whose signal is directly received on the LOS is less than or equal to a reference value (the reference value may be any number, including one, two, three, four or greater than four).

When the receiving state of the satellite navigation receiver 10 is substantially unsatisfactory, the controller 50 may be configured to extract the road bounding sphere using the image sensor 30 and the distance sensor 40, respectively (S13). The controller 50 may be configured to extract a linear component from the image output from the image sensor 30 as the road bounding sphere. Further, the controller 50 may be configured to extract the linear component as the road bounding sphere based on the distance information between the own vehicle and objects which may be measured by the distance sensor 40. The controller 50 may also be configured to extract the minimum bounding sphere of the extracted road bounding spheres (S14). In other words, the controller 50 may be configured to extract the area for the same target from the extracted road bounding spheres. The controller 50 may be configured to generate the possible driving path based on the minimum bounding sphere (S15). Next, the controller 50 may be configured to operate the driving of the vehicle along the generated possible driving path.

Meanwhile, the controller 50 may be configured to confirm whether the receiving state of the satellite navigation receiver 10 is operating substantially normally and the reliability of the receiving information is less than a reference value (S16). (By normal operation, it should be understood that the receiver 10 receives signals satisfactorily for GPS navigation function, etc.) The controller 50 may be configured to extract some of the up-to-date GPS signals among the GPS signals received through the satellite navigation receiver 10 as the sample and calculate the standard deviation (sample standard deviation) for the extracted GPS signals as the sample. Further, the controller 50 may be configured to confirm whether the calculated standard deviation exceeds the threshold. The controller 50 may be configured to extract the road facilities using the image sensor 30 and extract the surrounding vehicle information using the distance sensor 40 when the reliability of the information received through the satellite navigation receiver 10 is less than the reference value (S17). In other words, when the receiving information received through the satellite navigation receiver 10 has a meter unit error (from about 1 m to 10 m), the controller 50 may be configured to extract the road facilities from the image acquired by the image sensor 30 and detect the surrounding vehicle information such as whether the surrounding vehicles are present and distances from the surrounding vehicles using the distance sensor 40.

The controller 50 may be configured to map the road facilities extracted by the image sensor 30 with the landmark within the map data stored in the map storage 20 to correct the longitudinal position and determine the driving lane based on the surrounding vehicle information detected by the distance sensor 40 to correct the latitudinal position (S18). In particular, the controller 50 may be configured to correct the position of the vehicle using the probability based filter. Meanwhile, the controller 50 may be configured to confirm whether the detailed map is present when the reliability of the GPS signal is equal to or greater than the reference value (S19).

When the presence detailed map is confirmed, the controller 50 may be configured to detect the substantially long range obstacles and the substantially short range obstacles, respectively, using the image sensor 30 and the distance sensor 40. In other words, when the receiving information included in the GPS signal has the centimeter unit error (e.g., when the lane information on which the vehicle is currently positioned may be confirmed), the substantially long range obstacles may be extracted within the image acquired by the image sensor 30. Further, the controller 50 may be configured to detect the substantially short range obstacles which are positioned around the vehicle using the distance sensor 40 and measure the distances from the substantially short range obstacles. The controller 50 may be configured to predict the behaviors of the surrounding vehicles based on the information regarding the obstacles extracted by the image sensor 30 and the distance sensor 40 (S21). In other words, the controller 50 may be configured to map the extracted information regarding the obstacles with the detailed map to recognize the front situation and surrounding situations, thereby predicting the behaviors of the surrounding vehicles.

In step S19, when the detailed map is not present, the controller 50 may be configured to extract the driving lane information using the image sensor 30 and extract the surrounding vehicle information using the distance sensor 40 (S22). Further, the controller 50 may be configured to apply the probability based filtering to the driving lane information and the surrounding vehicle information to correct the latitudinal position of the own vehicle (S23). Next, the controller 50 may be configured to recognize the driving environment based on the above-mentioned procedures and controls the driving of the own vehicle based on the recognized driving environment. As described above, according to the exemplary embodiments of the present invention, it may be possible to more accurately recognize the driving environment by making the fusion method of an image sensor and a distance sensor different based on the precision of the global positioning system (GPS) information and the map information and cope with situations based on the recognized driving environment.

Meanwhile, all the components configuring the exemplary embodiment of the present disclosure are described as coupled in one or operated, being coupled with each other, but the present disclosure is not necessarily limited to the exemplary embodiments. That is, all the components may be operated, being optionally coupled with each other within the scope of the present disclosure. Further, all the components may be each implemented in one independent hardware, but a part or all of each component may be selectively combined to be implemented as a computer program having a program module performing some functions or all the functions combined in one or a plurality of hardwares. Codes and code segments configuring the computer program may be easily inferred by those skilled in the art. The computer program is stored in computer readable media and is read and run by a computer and thus the exemplary embodiment of the present disclosure may be implemented. An example of the storage media of the computer program may include a magnetic recording medium, an optical recording medium, a carrier wave medium, and the like.

Further, unless particularly described to the contrary, the term "comprise", "configure", "have", or the like which are described herein will be understood to imply the inclusion of the stated components, and therefore should be construed as including other components, not the exclusion of any other elements. It is to be understood that all the terms including technical and scientific terms has the same meaning as those that are understood by those who skilled in the art unless defined otherwise. It must be understood that generally used terms like the terms defined by the dictionary are identical with the meanings within the context of the related art, and unless clearly defined in the present disclosure, they should not be construed as ideally or excessively formal meaning.

The spirit of the present disclosure has been just exemplified. It will be appreciated by those skilled in the art that various modifications and alterations can be made without departing from the essential characteristics of the present disclosure. Accordingly, exemplary embodiments disclosed in the present disclosure and the accompanying drawings are used not to limit but to describe the spirit of the present disclosure. The scope of the present disclosure is not limited only to the exemplary embodiments and the accompanying drawings. The protection scope of the present disclosure must be analyzed by the appended claims and it should be analyzed that all spirits within a scope equivalent thereto are included in the appended claims of the present disclosure.

What is claimed is:

1. A system for recognizing a driving environment for an autonomous vehicle, comprising:
    a memory configured to store program instructions;
    a processor configured to execute the program instructions, the program instructions when executed configured to:
        receive navigation information from a satellite navigation receiver configured to receive a satellite signal from a satellite;
        receive map data from a map storage configured to store map data;
        receive image data from an image sensor configured to capture images around the autonomous vehicle;
        receive distance information from a distance sensor configured to sense objects positioned around the autonomous vehicle;
        determine a fusion method for information measured by the image sensor and the distance sensor based on a receiving state of the satellite navigation receiver and precision of the map data to recognize the driving environment;
        determine a reception strength of the navigation information;
        determine a precision level of the map data; and
        extract an object from information measured by the image sensor and the distance sensor based on the reception strength of the navigation information and the precision level of the map data,
    wherein the extracted object is used to recognize the driving environment.

2. The system according to claim 1, wherein the program instructions when executed are further configured to:
 extract road bounding spheres using the image data from the image sensor and the distance information from the distance sensor; and
 derive a minimum bounding sphere of the extracted road bounding spheres, when the satellite signal is not received or the number of satellites whose signals are directly received on a line of sight (LOS) is equal to or less than a reference value.

3. The system according to claim 2, wherein the program instructions when executed are further configured to:
 map the minimum bounding sphere with the map data to generate a possible driving path.

4. The system according to claim 1, wherein the program instructions when executed are further configured to:
 extract road facilities using the image data from the image sensor; and
 extract surrounding vehicle information using the distance information from the distance sensor when received information included in the satellite signal is in an error range within several meters.

5. The system according to claim 4, wherein the program instructions when executed are further configured to:
 perform probability based filtering on a comparison result of the road facilities with a landmark within the map data and the surrounding vehicle information to correct longitudinal and latitudinal positions of the vehicle.

6. The system according to claim 1, wherein the program instructions when executed are further configured to:
 extract a substantially long range obstacle using the image data from the image sensor; and
 extract a substantially short range obstacle using the distance information from the distance sensor when received information included in the satellite signal is within an error range and the map data is sufficiently precise.

7. The system according to claim 6, wherein the program instructions when executed are further configured to:
 map the substantially long range obstacle and the substantially short range obstacle with the map data to recognize a driving situation and predict a behavior of a surrounding vehicle based on the driving situation.

8. The system according to claim 1, wherein the program instructions when executed are further configured to:
 extract driving lane information using the image data from the image sensor; and
 extract surrounding vehicle information using the distance information from the distance sensor when received information included in the satellite signal is within an error range and the precision level of the map data is sufficiently precise.

9. The system according to claim 8, wherein the program instructions when executed are further configured to:
 perform probability based filtering on the driving lane information and the surrounding vehicle information to correct a latitudinal position of the vehicle.

10. A method for recognizing a driving environment for an autonomous vehicle, comprising:
 determining, by a controller, a reception strength of a satellite signal received from a satellite;
 determining, by the controller, a precision level of map data received from a map storage configured to store map data; and
 extracting, by the controller, an object from information measured by an image sensor configured to capture images around the autonomous vehicle and a distance sensor configured to sense objects positioned around the autonomous vehicle based on the reception strength of the satellite signal and the precision level of the map data,
 wherein the extracted object is used to recognize the driving environment.

11. The method according to claim 10, further comprising:
 confirming, by the controller, whether the reception strength of the satellite signal is less than a reference value;
 extracting, by the controller, a road facility and surrounding vehicle information, respectively, using the image sensor and the distance sensor when the reception strength of the satellite signal is less than the reference value; and
 correcting, by the controller, longitudinal and latitudinal positions of the vehicle by performing probability based filtering on the road facility and the surrounding vehicle information.

12. The method according to claim 11, further comprising:
 determining, by the controller, that the map data is sufficiently precise when the reception strength of the satellite signal is equal to or greater than the reference value;
 extracting, by the controller, a substantially long range obstacle and a substantially short range obstacle using the image sensor and the distance sensor, respectively, when the map data is sufficiently precise; and
 predicting, by the controller, a behavior of the surrounding vehicle by mapping the long range obstacle and the substantially short range obstacle with the map data.

13. The method according to claim 12, further comprising:
 extracting, by the controller, driving lane information and the surrounding vehicle information using the image sensor and the distance sensor, respectively, when the map data is not sufficiently precise; and
 performing, by the controller, probability based filtering on the driving lane information and the surrounding vehicle information to correct a latitudinal position of the vehicle.

14. The method according to claim 10, further comprising:
 extracting, by the controller, a road bounding sphere using the image sensor and the distance sensor when reception of the satellite signal is substantially unsatisfactory;
 extracting, by the controller, a minimum bounding sphere of the road bounding spheres; and
 generating, by the controller, a possible driving path based on the minimum bounding sphere.

15. A non-transitory computer readable medium containing program instructions executed by a processor or controller for recognizing driving environment for an autonomous vehicle, the computer readable medium comprising:
 program instructions that determine a reception strength of a satellite signal received from a satellite;
 program instructions that determine a precision level of map data received from a map storage configured to store map data; and
 program instructions that extract an object from information measured by an image sensor configured to capture images around the autonomous vehicle and a distance sensor configured to sense objects positioned around the autonomous vehicle based on the reception strength of the satellite signal and the precision level of the map data,
 wherein the extracted object is used to recognize the driving environment.

16. The non-transitory computer readable medium according to claim 15, further comprising:

program instructions that confirm whether the reception strength of the satellite signal is less than a reference value;

program instructions that extract a road facility and surrounding vehicle information, respectively, using the image sensor and the distance sensor when the reception strength of the satellite signal is less than the reference value; and program instructions that correct longitudinal and latitudinal positions of the vehicle by performing probability based filtering on the road facility and the surrounding vehicle information.

17. The non-transitory computer readable medium according to claim 16, wherein the program instructions that recognize driving environment further include:

program instructions that determine whether the map data is sufficiently precise when the reception strength of the satellite signal is equal to or greater than the reference value;

program instructions that extract a substantially long range obstacle and a substantially short range obstacle using the image sensor and the distance sensor, respectively, when the map data is sufficiently precise; and program instructions that predict a behavior of the surrounding vehicle by mapping the substantially long range obstacle and the substantially short range obstacle with the detailed map.

18. The non-transitory computer readable medium according to claim 17, wherein the program instructions that recognize driving environment further include:

program instructions that extract driving lane information and the surrounding vehicle information using the image sensor and the distance sensor, respectively, when the map data is not sufficiently precise; and program instructions that perform probability based filtering on the driving lane information and the surrounding vehicle information to correct a latitudinal lateral position of the vehicle.

19. The non-transitory computer readable medium according to claim 15, further comprising:

program instructions that extract a road bounding sphere using the image sensor and the distance sensor when reception of the satellite signal is substantially unsatisfactory;

program instructions that extract a minimum bounding sphere of the road bounding spheres; and program instructions that generate a possible driving path based on the minimum bounding sphere.

* * * * *